United States Patent [19]

Wenzel et al.

[11] 4,310,278

[45] Jan. 12, 1982

[54] MOBILE DELIVERY FLOW UNIFIER

[75] Inventors: Jurgen M. Wenzel, Dusseldorf; Horst V. Birkheuer, Hilden, both of Fed. Rep. of Germany

[73] Assignee: Mannesmann DeMag AG, Duisburg, Fed. Rep. of Germany

[21] Appl. No.: 112,398

[22] Filed: Jan. 15, 1980

[30] Foreign Application Priority Data

Feb. 21, 1979 [DE] Fed. Rep. of Germany ....... 2906623

[51] Int. Cl.³ ............................................. B65G 41/00
[52] U.S. Cl. ..................................... 414/332; 414/460
[58] Field of Search ............... 414/332, 460, 461, 919; 198/311

[56] References Cited

U.S. PATENT DOCUMENTS 3,064,832 11/1962 Heltzel ................................ 414/332
3,807,591 4/1974 Zinno et al. ......................... 414/460

FOREIGN PATENT DOCUMENTS 355468 6/1922 Fed. Rep. of Germany .
650030 9/1937 Fed. Rep. of Germany .
1382320 9/1964 France .

Primary Examiner—Robert G. Sheridan
Attorney, Agent, or Firm—Mandeville and Schweitzer

[57] ABSTRACT

A transportable hoisting support is provided for a mobile bulk goods delivery system. The support is in the form of a three-legged frame with two legs positioned at one end of the bulk goods delivery system and the remaining leg at the opposite end. The two ends are connected by the frame which bridges the conveyor system and the recess formed to receive the bulk goods. The support of the invention includes hoisting means for elevating the conveyor for transporting it from place to place and transport means in the legs thereof for moving the support with the associated delivery system. The invention provides support for movement of the belt conveyor delivery flow equalizer from place to place, while at the same time eliminating structure required previously for transport of the conveyor, which caused the upper delivery end of the conveyor to be too high for drop delivery of the goods to the next processing station in a bulk goods production line for certain applications.

13 Claims, 3 Drawing Figures

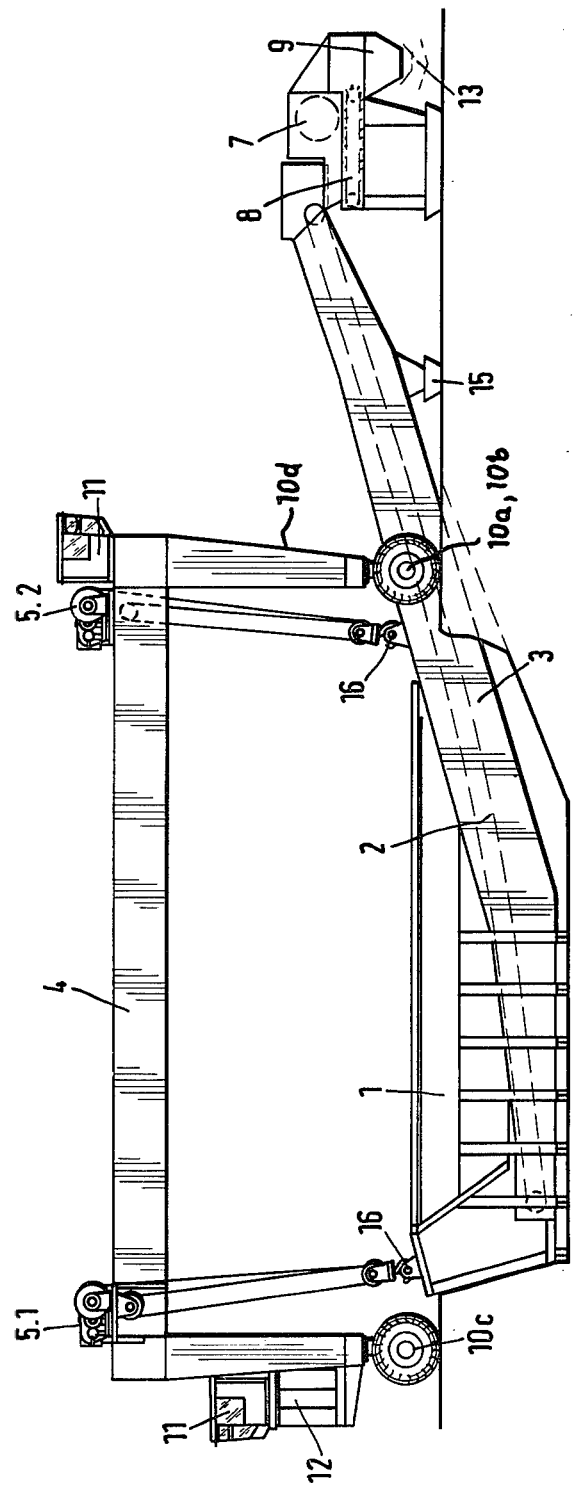

MOBILE DELIVERY FLOW UNIFIER

BACKGROUND AND STATEMENT OF THE INVENTION

The present invention relates to a mobile delivery flow unifier or equalizer, with a bunker provided beneath the travel plane to receive bulk materials discharged from trucks, and a conveyor belt system to transfer the bulk material removed from the bunker to the following elements of an open-cast equipment production line or chain. The elements include, in particular, screening and reducing plants positioned before removal conveyor belts. The bunker consists of a container open on top and structurally connected to the supporting frame of the conveyor belt system, such container to be at least partially submerged into a prepared cut-out provided below the travel plane, beneath the discharge level of the truck. The conveyor belt of the conveyor belt system, which is to receive the bulk goods, leads laterally into the container in such a way that the conveyor belt essentially forms the bottom of the container, as disclosed in U.S. patent application Ser. No. 33,851, filed Apr. 27, 1979, now abandoned, which is hereby incorporated by reference in its entirety.

Heavy truck transport utilized in the open-cast mining of coal and/or solid rock may prove too expensive, particularly for long distant travel and slopes, as compared to the use of conveyor belt plants. On the other hand, heavy truck transport has, in the operation of solid rock open-cast mining, great economical advantages due to its flexibility. This has led to a combination in increasing measure of both methods of transport. To this end, a connecting element between the discontinuous heavy truck transport and the continuous conveyor belt system transport is required, as the conveyor belt systems cannot readily cope with the frequently oversize bulk goods portions which sometimes arrive in great quantities during the transfer. For this reason, delivery flow equalizers are utilized, as described in patent application Ser. No. 33,851.

In that application, delivery flow unifiers or equalizers according to the principal concept of the present patent application are, for purposes of transport, swiveled around a horizontal axis from a prepared cut-out area or below the travel surface. It is necessary, therefore, to use a sufficiently long projection length of the conveyor belt supporting frame as a counterweight to the empty bunker. If the horizontal swivel axis is placed near the mass center, this will lead directly to a great height for the drop of materials, such as is required for charging mobile crusher plants.

A great drop height, however, is not always required, for example, if conveyor belts are to be charged. For low drop levels, however, the free projection length of the delivery flow unifier is insufficient to arrange the horizontal swivel axis near the mass center. At the same time, the arrangement of the undercarriage or step mechanism below the frame body carrying the conveyor belt system cannot be obtained in a simple manner.

The present invention is, therefore, based on creating a mobile hoisting apparatus for the delivery flow unifier for optimum operation with the most economical construction possible. To solve this problem, the invention arranges the delivery flow unifier, in a permanent or detachable fashion, at the frame of a hoisting mechanism provided with a drive or transport mechanism and spanning the bunker and at least a part of the conveyor belt system. With the arrangement of a horizontal swivel axis, it is independent from the mass center of the delivery flow unifier, since the hoisting unit above the delivery flow unifier permits lifting out of the recess. By disconnecting the delivery flow unifier or equalizer, it becomes possible, after setting down the bunker, to handle other devices by means of the hoisting mechanism, so that one hoisting mechanism may be coordinated with a multitude of delivery flow unifiers and/or other similar apparatus.

Preferably, the hoisting mechanism is formed as a three-point frame and the transport mechanisms are provided at the three supporting legs of the hoisting mechanism. The motive mechanisms may be constructed to use wheels, a caterpiller or a step mechanism, which are structurally united with or detachable from the supporting legs.

The proposal to have all motive mechanisms coordinated by means of a programmed control makes it possible to displace the mobile delivery flow unifier in all travel directions from a standstill and while in motion. A most economical solution is to have, according to one aspect of the invention, the two-point end of the moving mechanism designed as an undercarriage, which moves parallel to and on both sides of the conveyor belt system, and to have the one-point end on the opposite free side of the bunker, whereby only the one-point side is maneuverable. Preferably, hoisting units in the form of cable pulls and/or hydraulic cylinder units are provided between the bunker and/or frame of the conveyor belt system, and the frame of the mobile hoisting mechanism to lift the bunker out of the recess.

According to another aspect of the invention, the hoisting units between the hoisting mechanism and the bunker are detachable, and it then becomes possible to transport several delivery flow unifiers or similar apparatus in open-cast mining by means of one hoisting mechanism. Also, according to the invention, the inside height of the frame of the hoisting mechanism is adapted to the height required for clearance of transport vehicles traveling on planks above the bunker. Thus, it becomes possible to drive heavy ground evacuators across the bunker container in order to charge the latter. Finally, the invention includes equipping the delivery flow unifier at the removal end of the conveyor belt system with a known rotary breaker, where the oversize bulk goods portions may be reduced to transportable sizes.

Examples of the invention are shown in the drawings and explained as follows:

DESCRIPTION OF THE DRAWINGS

FIG. 3 is a side elevational view, illustrating a further embodiment of the hoisting mechanism.

DETAILED DESCRIPTION OF THE INVENTION

Figure 1:
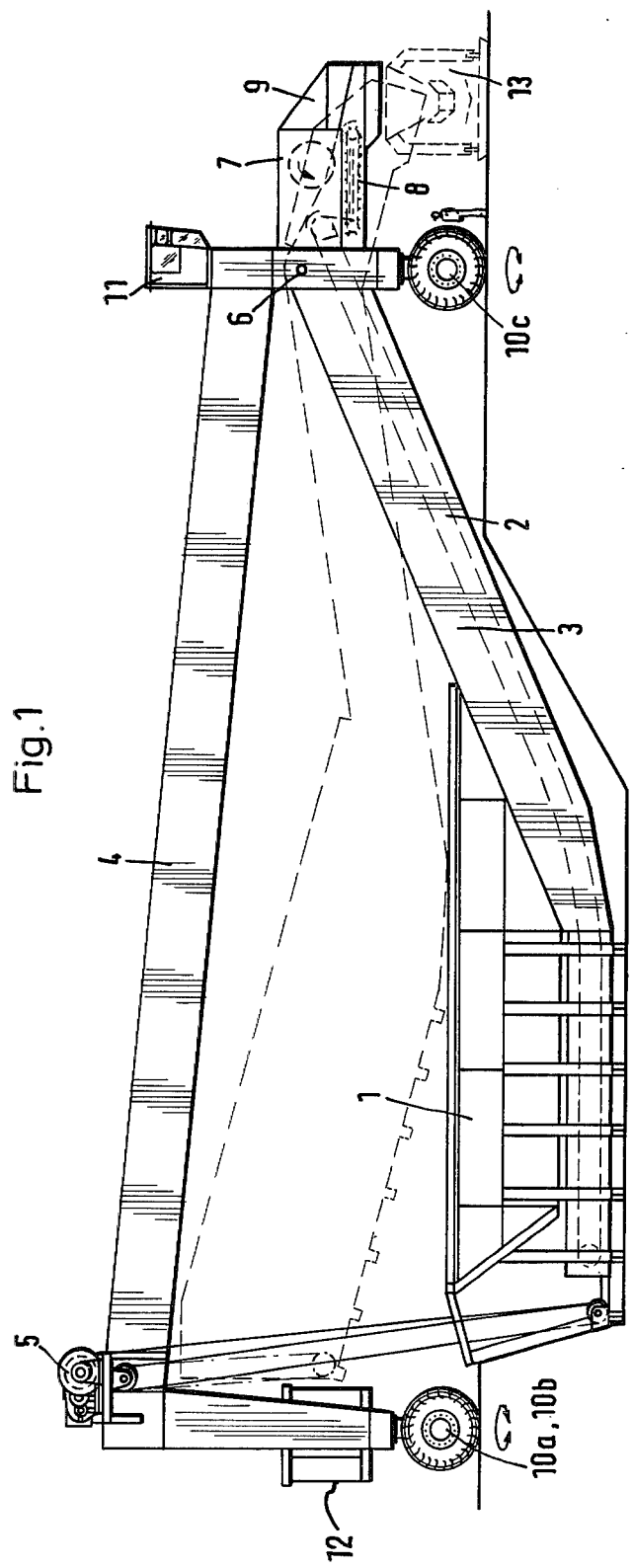
FIG. 1 is a side elevational view, illustrating a hoisting mechanism according to the invention.

FIG. 1 shows the bunker as 1, lowered into a recess in the floor or ground. The conveyor belt 2, extending essentially across the floor of bunker 1, is led out of the recess at the conveyor belt supporting frame 3 joined to the bunker 1. At 6, the conveyor belt supporting frame 3 pivots around a horizontal swivel axis on the frame 4 of the mobile hoisting mechanism. Frame 4 extends bridge-like across the bunker 1 and the supporting frame 3 on three wheel carriages 10a, 10b and 10c. At the free end of the conveyor belt 2, a rotary breaker 7 is provided, which transfers the reduced bulk goods to a removal transport plant 13 via a chain conveyor 8, and via baffle wall with drop chute 9. The wheel carriages 10a, 10b and 10c swivel independently around vertical axes. However, they can be coordinated by means of a program control, not shown, so that the mobility of the mobile hoisting mechanism in any desired direction is guaranteed.

Figure 2:
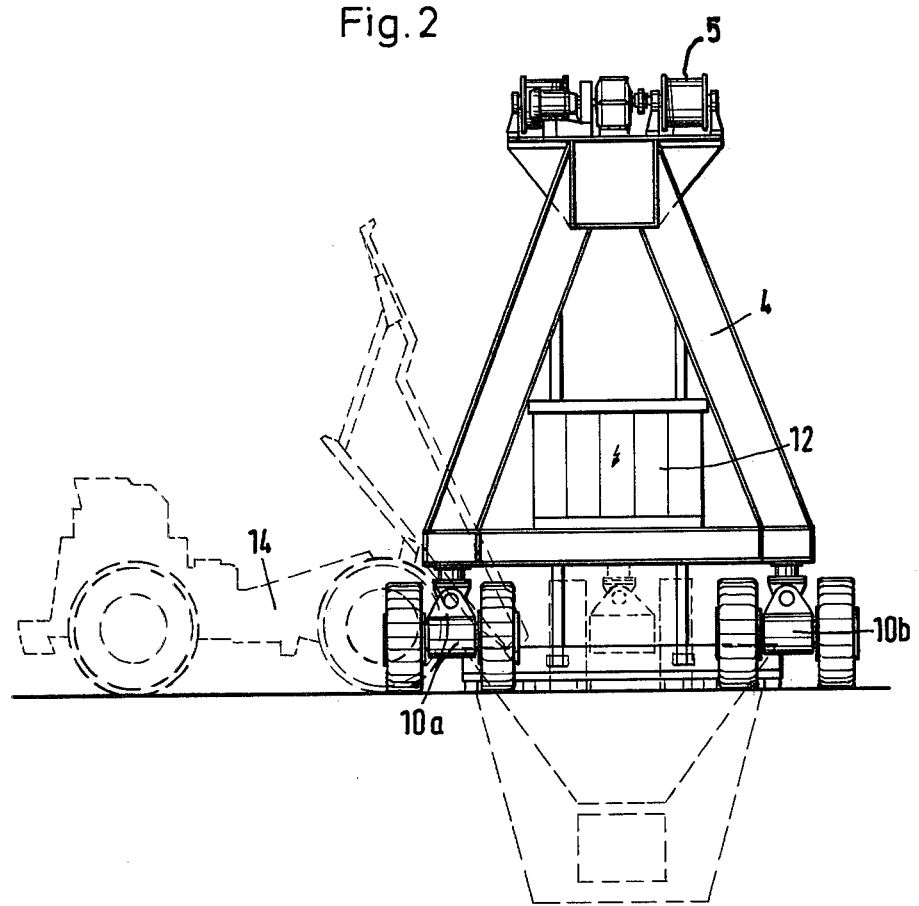
FIG. 2 is a hoisting mechanism according to FIG. 1, turned by 90°.

In FIG. 2 like parts have like numbers. It is shown that the frame 4 of the mobile hoisting mechanism is designed at the two-point end, as a triangular beam, whose interior accommodates the elements 12 of the energy source. At the one-point end of the frame, the operating stand 11 is shown, from where the entire apparatus is controlled and operated (FIG. 1).

FIG. 3 shows another arrangement of the mobile hoisting mechanism without the horizontal swivel axis 6, according to FIG. 1. This is made possible by having the two-point end 10d of the frame 4 of the hoisting mechanism span the supporting frame 3 of the conveyor belt 2, and by providing the one-point end 10c of the hoisting mechanism - to the left of the bunker on the drawing. This solution requires two hoisting units, 5.1 and 5.2, for lifting the bunker and the conveyor belt supporting frame vertically out of the recess. This arrangement provides that only the one-point wheel carriage 10c is maneuverable. The remaining two carriages 10a and 10b travel parallel to the conveyor belt direction.

In both cases, the bunker is lifted above the height of the level ground surface for transport by means of the hoisting units 5, which are shown in this example as cable pulls, so that the hoisting mechanism can travel.

As indicated in FIG. 3 at 16, the hinge devices of the hoisting units 5, 5.1, 5.2 may be joined to the bunker 1 and/or the conveyor belt supporting frame 3 in detachable fashion, so that the mobile hoisting mechanism 4 is independent from any one delivery flow unifier. It may rather be utilized for several delivery flow unifiers, or also for other devices in succession.

We claim:

1. A support for a mobile bulk delivery apparatus for equalizing delivery of bulk goods to a processing line, comprising
    (a) an elongated delivery frame;
    (b) an endless delivery belt mounted for movement on said delivery frame;
    (c) a bulk goods receiving container mounted on one end of said delivery frame;
    (d) said endless delivery belt extending into said receiving container;
    (e) the top run of said endless belt forming the bottom surface of said receiving container;
    (f) a support frame extending over and bridging said elongated delivery frame;
    (g) said delivery frame being pivotally connected in a vertical plane to said support frame at a pivot point distally located from said receiving container;
    (h) a plurality of mobile ground engaging power transport means on said support frame;
    (i) at least one of said transport means positioned to pass on a side of said elongated delivery frame; and
    (j) hoisting means extending between said elongated delivery frame and said bridging support frame, said hoisting means being located at the end of said delivery frame to which said receiving container is mounted.

2. The apparatus of claim 1, further characterized by
    (a) said ground engaging transport means are three legs, with two legs positioned at one end of said elongated delivery frame; and
    (b) said two legs spaced apart to pass on each side of said elongated delivery frame.

3. The apparatus of claim 2, further characterized by
    (a) said mobile ground engaging transport means are wheels connected to each of said three legs.

4. The apparatus of claim 3, further characterized by
    (a) said mobile ground engaging transport means are detachable from said legs.

5. The apparatus of claim 4, further characterized by
    (a) all said mobile ground engaging power transport means are connected to a single program control.

6. The apparatus of claim 2, further characterized by
    (a) one of said legs positioned at the end of said elongated delivery frame opposite from said two spaced legs; and
    (b) said one leg being steerable.

7. The apparatus of claim 1, further characterized by
    (a) said hoisting means are cable hoists.

8. The apparatus of claim 1, further characterized by
    (a) said hoisting means are hydraulic cylinder units.

9. The apparatus of claim 1, further characterized by
    (a) said hoisting means are detachable from said elongated delivery frame.

10. The apparatus of claim 1, further characterized by
    (a) said support frame and said hoisting means bridge said elongated delivery frame at a height to enable transport vehicles to pass thereunder.

11. The apparatus of claim 1, further characterized by
    (a) a rotary rock crusher positioned at the delivery end of said endless belt conveyor.

12. A suppor as claimed in claim 1, wherein:
    (a) said pivot point extends horizontally through said support frame; and
    (b) said pivot point is located at the end of said delivery frame opposite the end on which said receiving container is mounted.

13. A support as claimed in claim 1, wherein:
    (a) a second hoisting mechanism is located between said support frame and said delivery frame;
    (b) said second hoisting mechanism being secured to said delivery frame at a point between said receiving container and said pivot point.

* * * * *